US012604008B2

(12) United States Patent

Chernyak et al.

(10) Patent No.:     US 12,604,008 B2

(45) Date of Patent:       Apr. 14, 2026

(54) ADAPTIVE CLIPPING IN MODELS PARAMETERS DERIVATIONS METHODS FOR VIDEO COMPRESSION

(71) Applicant: Tencent America LLC, Palo Alto, CA (US)

(72) Inventors: Roman Chernyak, Santa Clara, CA (US); Biao Wang, San Jose, CA (US); Lien-Fei Chen, Palo Alto, CA (US); Ziyue Xiang, Palo Alto, CA (US); Yonguk Yoon, Palo Alto, CA (US); Motong Xu, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/923,643

(22) Filed: Oct. 22, 2024

(65) Prior Publication Data

US 2025/0168348 A1      May 22, 2025

Related U.S. Application Data

(60) Provisional application No. 63/602,343, filed on Nov. 22, 2023.

(51) Int. Cl.
| | |
|---|---|
| *H04N 19/132* | (2014.01) |
| *H04N 19/105* | (2014.01) |
| *H04N 19/176* | (2014.01) |

(52) U.S. Cl.
CPC ......... *H04N 19/132* (2014.11); *H04N 19/105* (2014.11); *H04N 19/176* (2014.11)

(58) Field of Classification Search
CPC ... H04N 19/132; H04N 19/105; H04N 19/176
USPC ....................................................... 375/240.2
See application file for complete search history.

(56) References Cited

U.S. PATENT DOCUMENTS

| | | | | |
|---|---|---|---|---|
| 2020/0374513 A1* | 11/2020 | Xiu | ......................... | H04N 19/64 |
| 2021/0352277 A1* | 11/2021 | Filippov | .............. | H04N 19/167 |
| 2024/0259555 A1* | 8/2024 | Zhang | ................... | H04N 19/176 |

* cited by examiner

*Primary Examiner* — Susan E. Hodges

(74) *Attorney, Agent, or Firm* — ARENTFOX SCHIFF LLP

(57) ABSTRACT

A method includes receiving a bitstream of coded information for pictures. The coded information indicates a prediction of a current block using a model based prediction technique, the model based prediction technique generates a prediction sample of the current block based on a model with one or more reconstructed samples of a reference block being input to the model, the model includes one or more parameters derived based on a current template of the current block and a reference template of the reference block. The method also includes performing at least a clipping operation on at least one of the current template and the reference template to obtain clipped template samples; deriving one or more parameter values of the one or more parameters of the model according to the clipped template samples; and generating at least a prediction sample of the current block by the model.

20 Claims, 10 Drawing Sheets

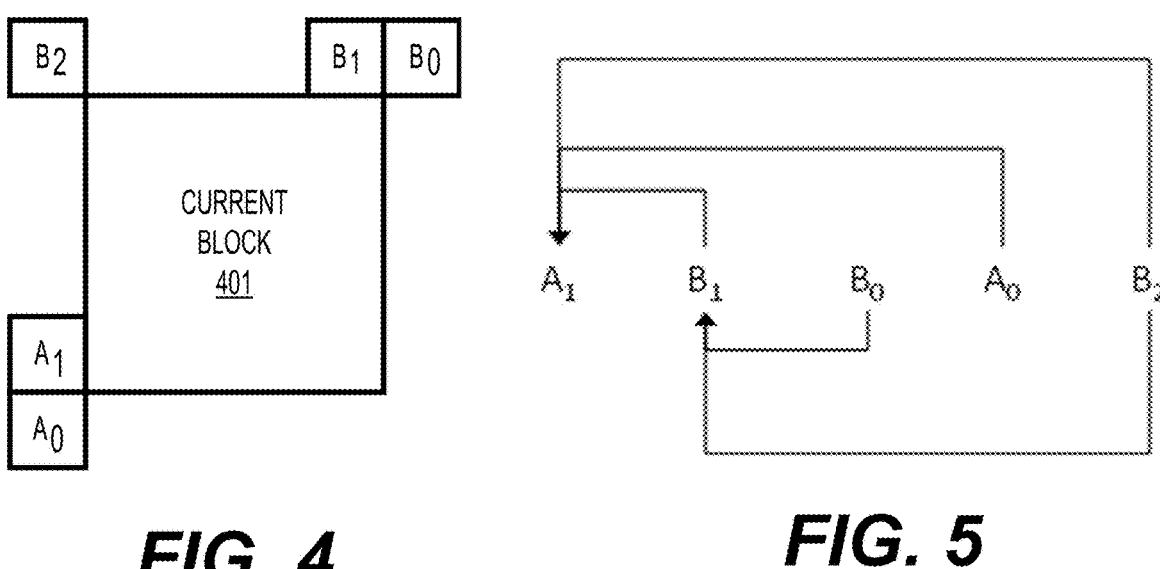
FIG. 4
FIG. 5
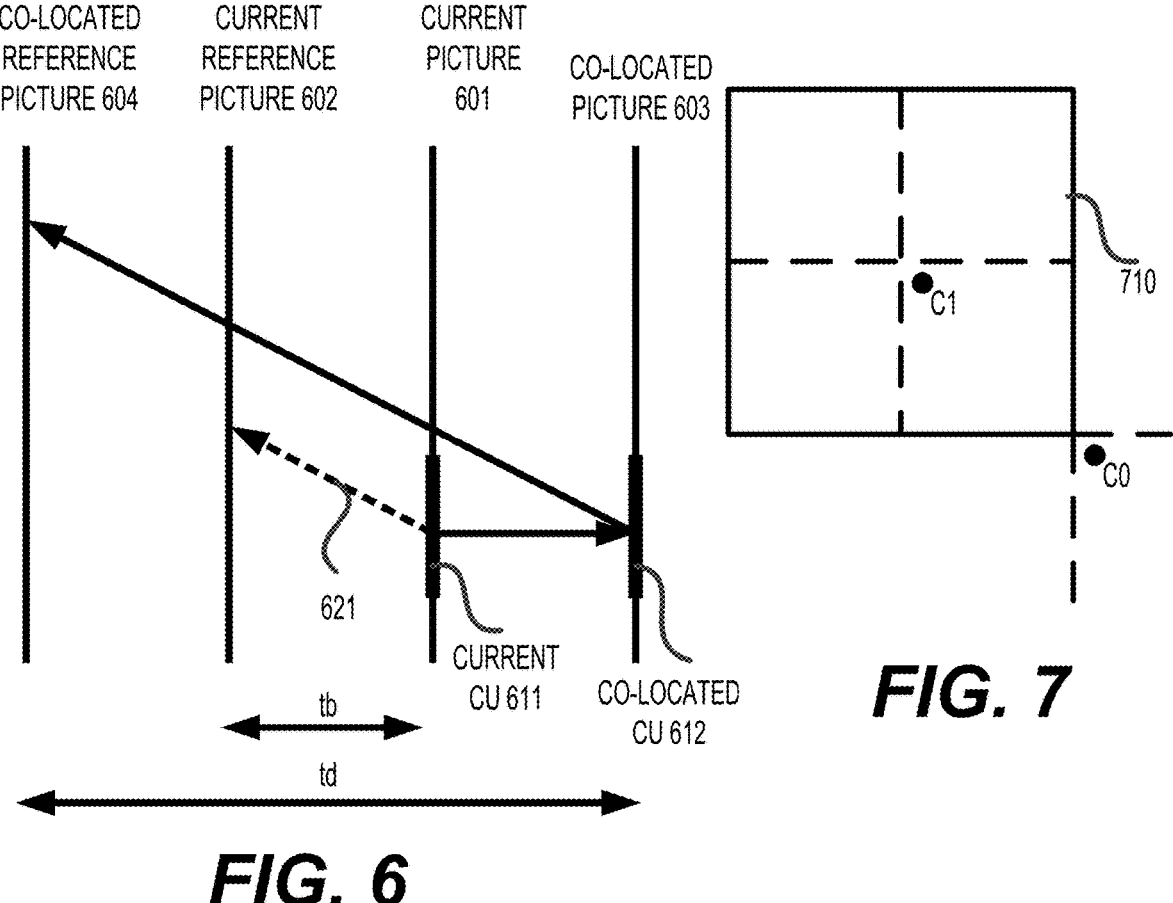
FIG. 6
FIG. 7

template
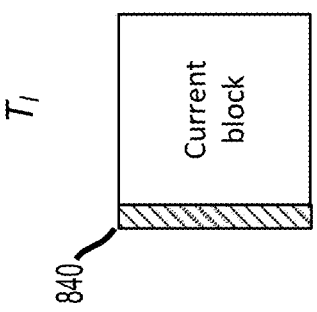
$T_l$
840
Current block
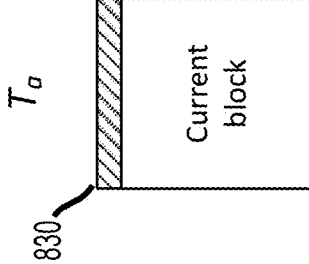
$T_a$
830
Current block
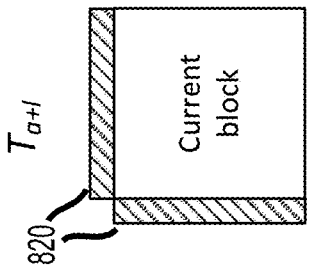
$T_{a+l}$
820
Current block
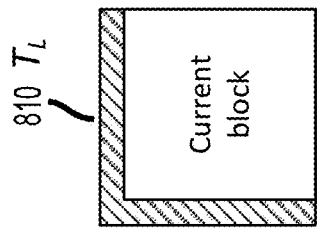
810 $T_L$
Current block
*FIG. 8*

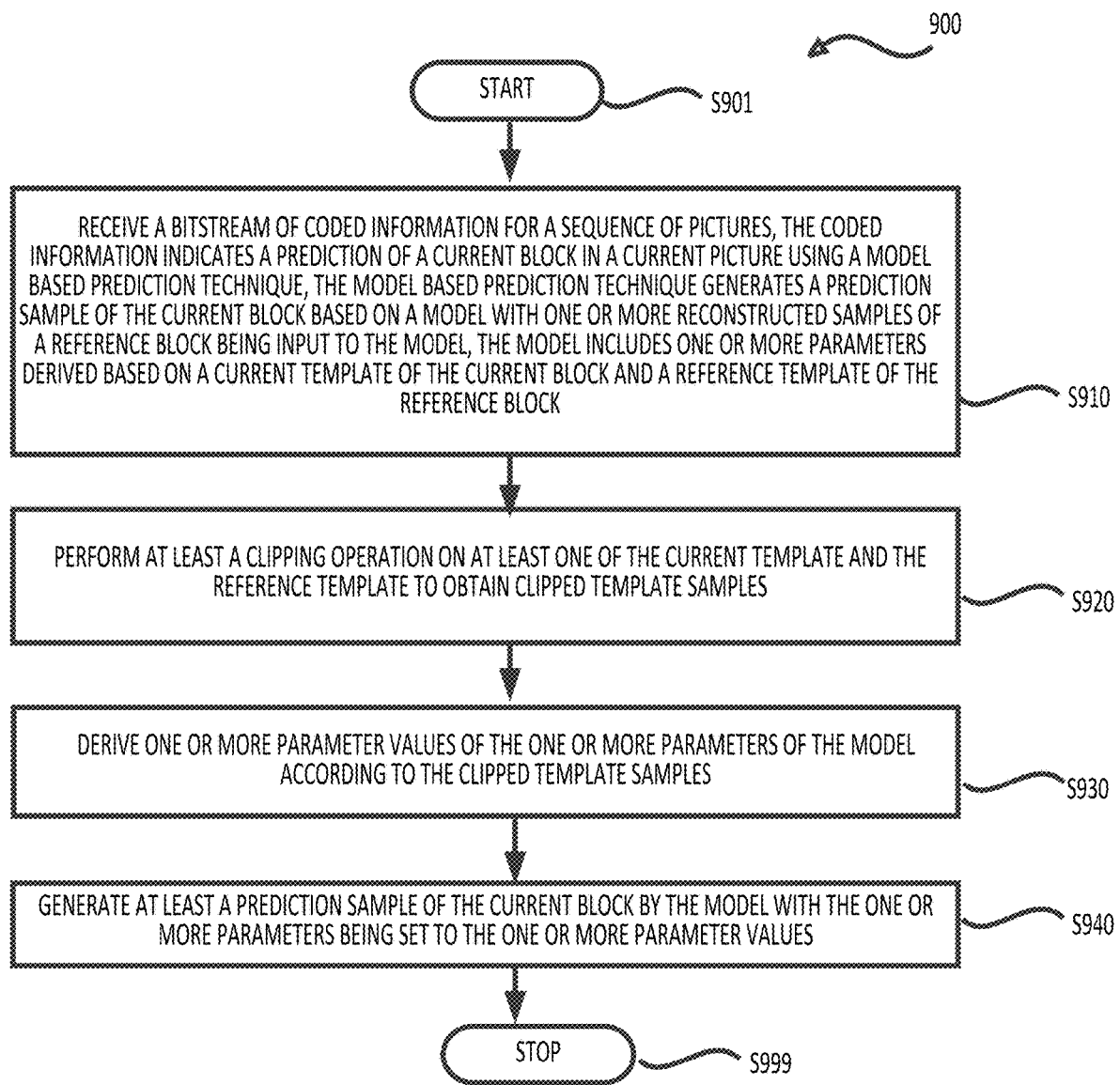

900

START ~ S901

RECEIVE A BITSTREAM OF CODED INFORMATION FOR A SEQUENCE OF PICTURES, THE CODED INFORMATION INDICATES A PREDICTION OF A CURRENT BLOCK IN A CURRENT PICTURE USING A MODEL BASED PREDICTION TECHNIQUE, THE MODEL BASED PREDICTION TECHNIQUE GENERATES A PREDICTION SAMPLE OF THE CURRENT BLOCK BASED ON A MODEL WITH ONE OR MORE RECONSTRUCTED SAMPLES OF A REFERENCE BLOCK BEING INPUT TO THE MODEL, THE MODEL INCLUDES ONE OR MORE PARAMETERS DERIVED BASED ON A CURRENT TEMPLATE OF THE CURRENT BLOCK AND A REFERENCE TEMPLATE OF THE REFERENCE BLOCK ~ S910

PERFORM AT LEAST A CLIPPING OPERATION ON AT LEAST ONE OF THE CURRENT TEMPLATE AND THE REFERENCE TEMPLATE TO OBTAIN CLIPPED TEMPLATE SAMPLES ~ S920

DERIVE ONE OR MORE PARAMETER VALUES OF THE ONE OR MORE PARAMETERS OF THE MODEL ACCORDING TO THE CLIPPED TEMPLATE SAMPLES ~ S930

GENERATE AT LEAST A PREDICTION SAMPLE OF THE CURRENT BLOCK BY THE MODEL WITH THE ONE OR MORE PARAMETERS BEING SET TO THE ONE OR MORE PARAMETER VALUES ~ S940

STOP ~ S999

*FIG. 9*

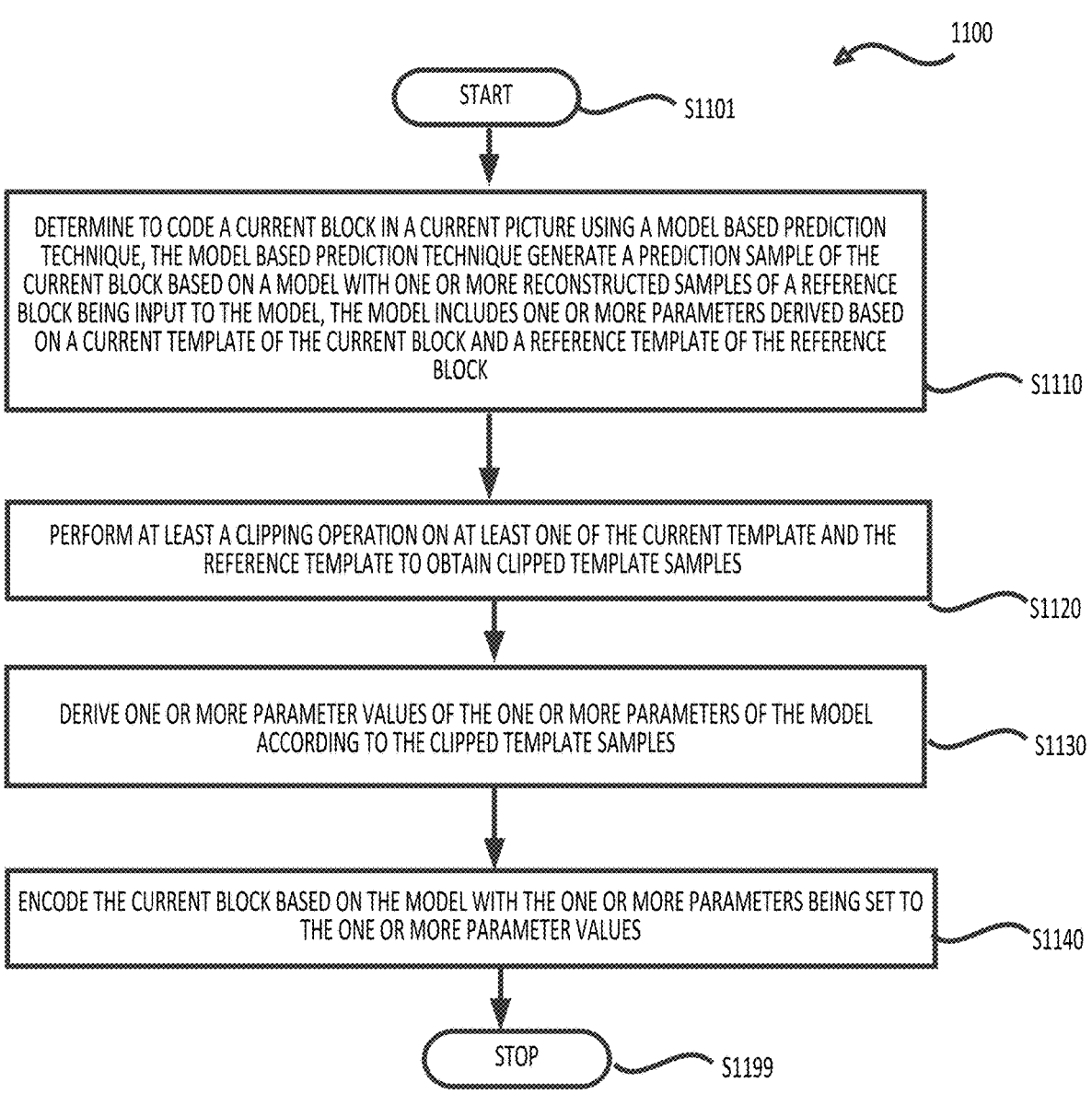

1100

START ⌇ S1101

DETERMINE TO CODE A CURRENT BLOCK IN A CURRENT PICTURE USING A MODEL BASED PREDICTION TECHNIQUE, THE MODEL BASED PREDICTION TECHNIQUE GENERATE A PREDICTION SAMPLE OF THE CURRENT BLOCK BASED ON A MODEL WITH ONE OR MORE RECONSTRUCTED SAMPLES OF A REFERENCE BLOCK BEING INPUT TO THE MODEL, THE MODEL INCLUDES ONE OR MORE PARAMETERS DERIVED BASED ON A CURRENT TEMPLATE OF THE CURRENT BLOCK AND A REFERENCE TEMPLATE OF THE REFERENCE BLOCK ⌇ S1110

PERFORM AT LEAST A CLIPPING OPERATION ON AT LEAST ONE OF THE CURRENT TEMPLATE AND THE REFERENCE TEMPLATE TO OBTAIN CLIPPED TEMPLATE SAMPLES ⌇ S1120

DERIVE ONE OR MORE PARAMETER VALUES OF THE ONE OR MORE PARAMETERS OF THE MODEL ACCORDING TO THE CLIPPED TEMPLATE SAMPLES ⌇ S1130

ENCODE THE CURRENT BLOCK BASED ON THE MODEL WITH THE ONE OR MORE PARAMETERS BEING SET TO THE ONE OR MORE PARAMETER VALUES ⌇ S1140

STOP ⌇ S1199

FIG. 11

ADAPTIVE CLIPPING IN MODELS PARAMETERS DERIVATIONS METHODS FOR VIDEO COMPRESSION

INCORPORATION BY REFERENCE

The present application claims the benefit of priority to U.S. Provisional Application No. 63/602,343, "Adaptive Clipping in Models Parameters Derivations Methods for Video Compression" filed on Nov. 22, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods and apparatuses for video encoding/decoding. In some examples, an apparatus for video encoding/decoding includes processing circuitry.

Some aspects of the disclosure provide a method of video decoding. The method includes: receiving a bitstream of coded information for a sequence of pictures, the coded information indicates a prediction of a current block in a current picture using a model based prediction technique, the model based prediction technique generates a prediction sample of the current block based on a model with one or more reconstructed samples of a reference block being input to the model, the model includes one or more parameters derived based on a current template of the current block and a reference template of the reference block. The method also includes performing at least a clipping operation on at least one of the current template and the reference template to obtain clipped template samples; deriving one or more parameter values of the one or more parameters of the model according to the clipped template samples; and generating at least a prediction sample of the current block by the model with the one or more parameters being set to the one or more parameter values.

Some aspects of the disclosure provide a method of video encoding. The method includes: determining to code a current block in a current picture using a model based prediction technique, the model based prediction technique generates a prediction sample of the current block based on a model with one or more reconstructed samples of a reference block being input to the model, the model includes one or more parameters derived based on a current template of the current block and a reference template of the reference block. The method also includes performing at least a clipping operation on at least one of the current template and the reference template to obtain clipped template samples; deriving one or more parameter values of the one or more parameters of the model according to the clipped template samples; and encoding the current block based on the model with the one or more parameters being set to the one or more parameter values.

Aspects of the disclosure also provide an apparatus for video encoding/decoding.

Aspects of the disclosure also provide a method for processing visual media data. In the method, a bitstream of visual media data is processed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 4 shows positions of spatial merge candidates according to an embodiment of the disclosure.

FIG. 5 shows candidate pairs that are considered for a redundancy check of spatial merge candidates according to an embodiment of the disclosure.

FIG. 6 shows example motion vector scaling for a temporal merge candidate in some examples.

FIG. 7 shows example candidate positions for a temporal merge candidate in some examples.

FIG. 8 shows diagrams of templates in some examples.

FIG. 9 shows a flow chart outlining a decoding process according to some aspects of the disclosure.

FIG. 11 shows a flow chart outlining an encoding process according to some aspects of the disclosure.

DETAILED DESCRIPTION

Figure 1:
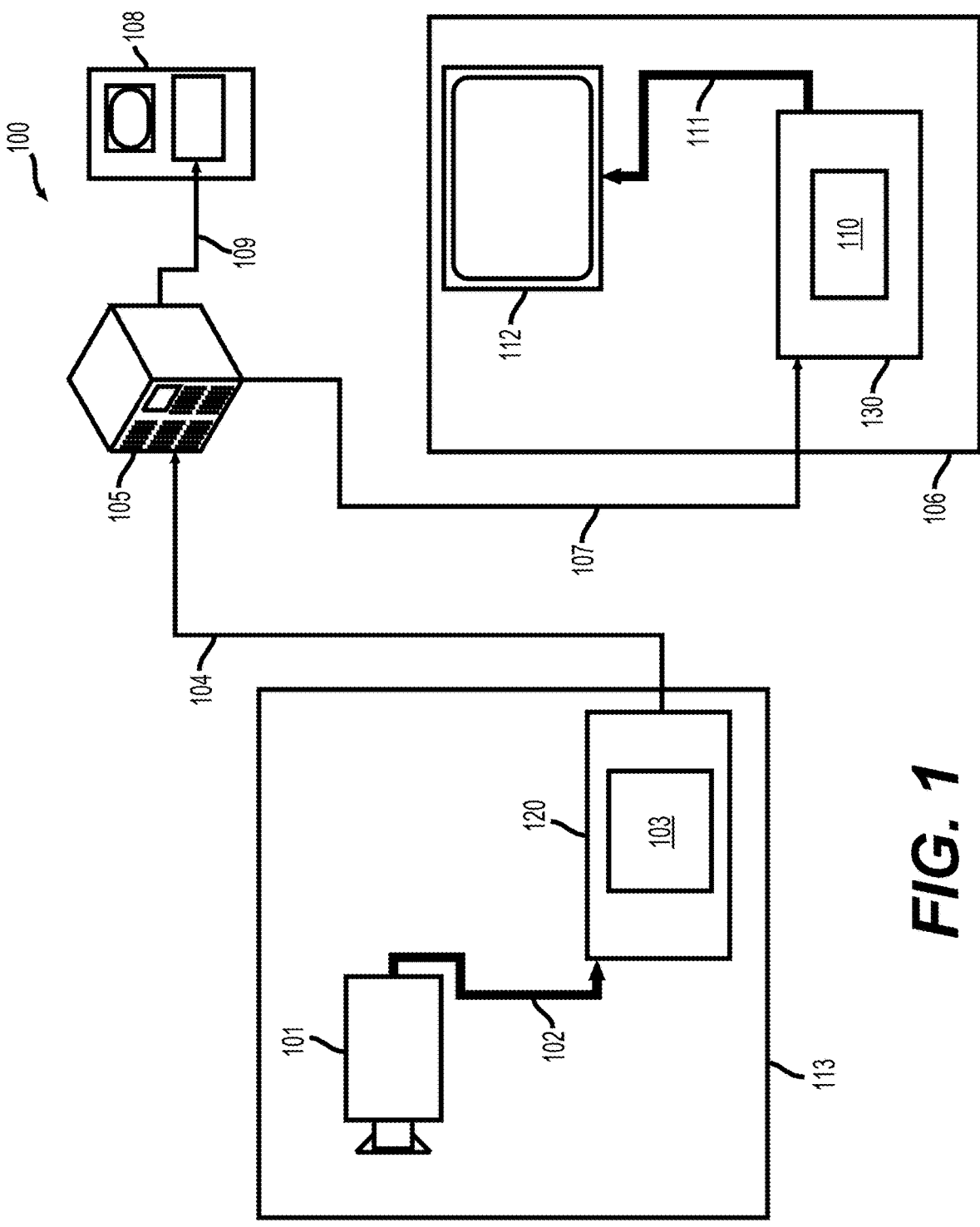
FIG. 1 is a schematic illustration of an example of a block diagram of a video processing system in some examples.

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
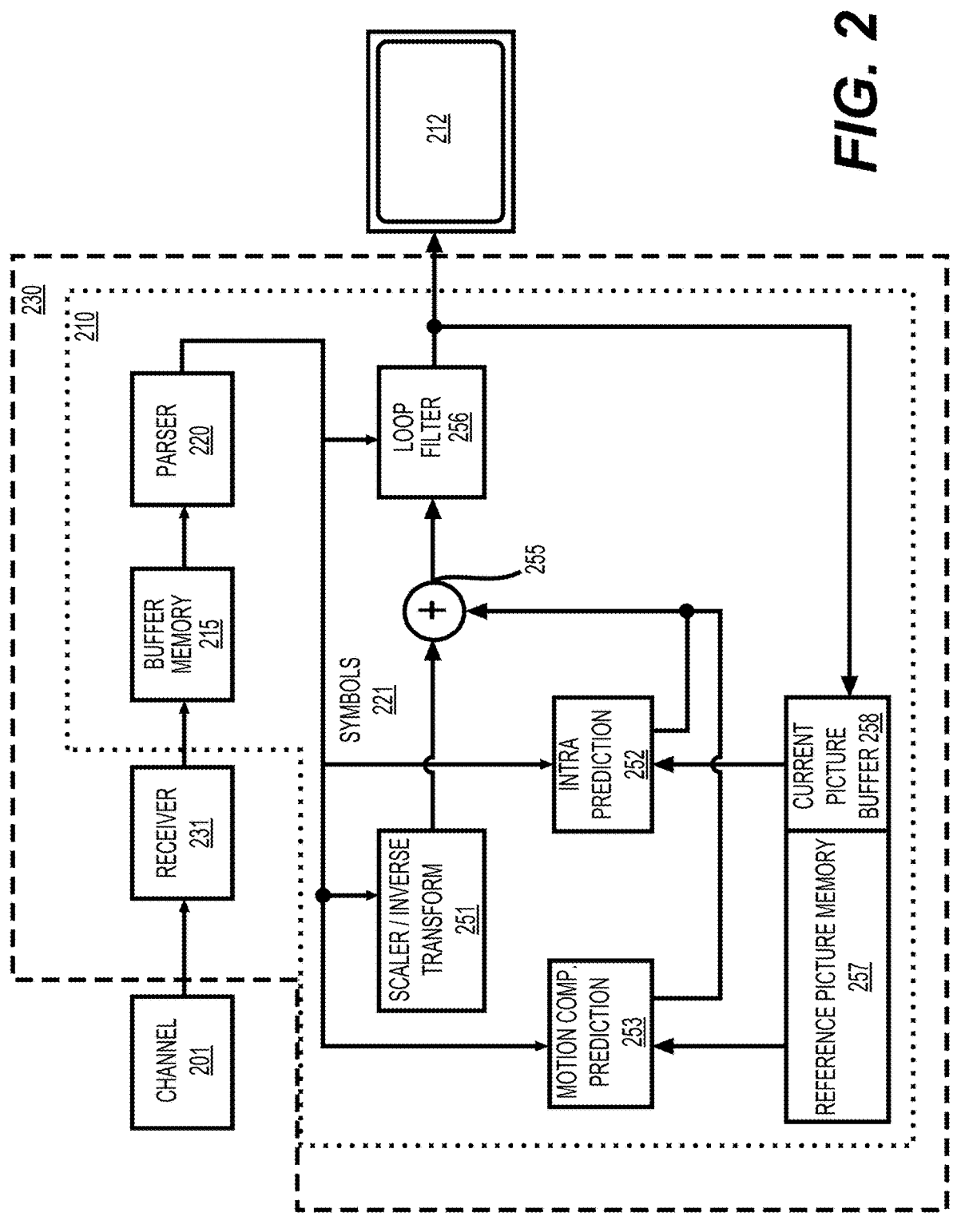
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
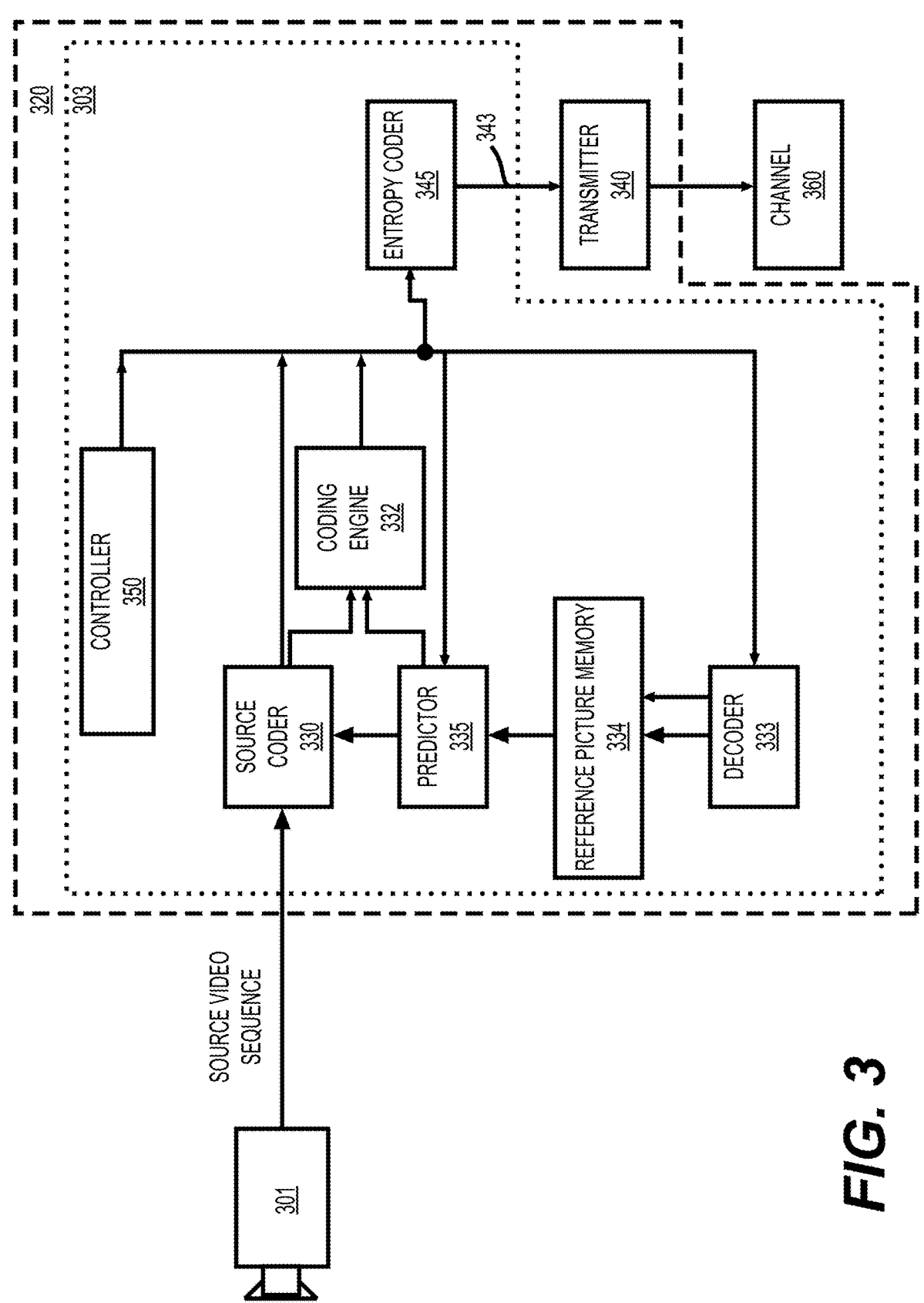
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some examples, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture.

The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Some aspects of the disclosure provide techniques of adaptive clipping in model parameter derivation for video compression. The techniques can be used for coded information derivation for inter prediction coding in some examples.

Various inter prediction modes can be used in video coding. For example, in VVC, for an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 4.

FIG. 4 shows positions of spatial merge candidates according to an embodiment of the disclosure. Referring to FIG. 4, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

To reduce computational complexity, not all possible candidate pairs are considered in the mentioned redundancy check. Instead, only pairs linked with an arrow in FIG. 5 are considered and a candidate is only added to the candidate list if the corresponding candidate used for the redundancy check does not have the same motion information.

FIG. 5 shows candidate pairs that are considered for a redundancy check of spatial merge candidates according to an embodiment of the disclosure. Referring to FIG. 5, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

In an embodiment, temporal candidate(s) are derived as follows. In an example, only one temporal merge candidate is added to the candidate list. FIG. 6 shows example motion vector scaling for a temporal merge candidate. To derive the temporal merge candidate of a current CU (611) in a current picture (601), a scaled MV (621) (e.g., shown by a dotted line in FIG. 6) can be derived based on a co-located CU (612) belonging to a collocated reference picture (604). A reference picture list used to derive the co-located CU (612) can be explicitly signaled in a slice header. The scaled MV (621) for the temporal merge candidate can be obtained as shown by the dotted line in FIG. 6. The scaled MV (621) can be scaled from the MV of the co-located CU (612) using picture order count (POC) distances tb and td. The POC distance tb can be defined to be the POC difference between a current reference picture (602) of the current picture (601) and the current picture (601). The POC distance td can be defined to be the POC difference between the collocated reference picture (604) of the co-located picture (603) and the co-located picture (603). A reference picture index of the temporal merge candidate can be set to zero. The collocated picture is a reference picture that is used as the source picture for temporal motion information derivation. The collocated picture can be identified in one of two lists, referred to as list0 or list1. In some examples, the encoder can determine the collocated picture and signal the collocated picture using suitable syntax techniques.

FIG. 7 shows example candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (710) of the current CU. The candidate position C1 is located at a center of the co-located CU (710) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, inter coded, and in the current row of CTUs, the candidate position C0 is used to derive the temporal merge candidate.

According to some aspects of the disclosure, model based prediction methods can be used in inter prediction or intra prediction. For inter prediction, a model based prediction method can use a model (e.g., a formular, a function) to generate samples of the current block in a current picture based on reference samples of a reference block in a reference picture. For intra prediction, a model based prediction method can use a model (e.g., a formular, a function) to generate a first color component of the current block based a second color component of the current block. In some examples, parameters in a model for a model based prediction method can be derived based on a template of the current block.

In some examples, local illumination compensation (LIC) is used as an inter prediction technique to model local illumination variation between a current block and a reference block of the current block by using a linear function. The reference block is in a reference picture, and can be pointed by motion vector (MV). The model is applied on the reference block to generate a prediction block. The parameters of a linear formular can include a scale $\alpha$ and an offset $\beta$, and the linear formular can be represented by $\alpha \times p[x, y] + \beta$ to compensate illumination changes, where $p[x, y]$ denotes a reference sample at a location $[x, y]$ in the reference block (also referred to as prediction block), the reference block is pointed to by MV from the current block. In some examples, the scale $\alpha$ and the offset $\beta$ can be derived based on a template of the current block and a corresponding reference template of the reference block by using the least square method, thus no signaling overhead is required, except that an LIC flag may be signaled to indicate the use of LIC. The scale $\alpha$ and the offset $\beta$ that are derived based on the template of the current block can be referred to as template based parameter set.

In some examples, LIC is used for uni-prediction inter CUs. In some examples, intra neighbor samples (neighboring samples that are predicted using intra prediction) of the current block can be used in LIC parameter derivation. In some examples, LIC is disabled for blocks with less than 32 luma samples. In some examples, for non subblock modes (e.g., non affine modes), LIC parameter derivation is performed based on the template block samples of the current CU, instead of partial template block samples for the first top-left 16×16 unit. In some examples, LIC parameter derivation is performed based on partial template block samples, such as the partial template block samples for the first top-left 16×16 unit. In some examples, template samples of the reference block are determined by using motion compensation (MC) with the MV of the block without rounding it to integer-pel precision.

In some examples, cross component prediction can be used as an intra prediction technique. The cross-component prediction can include a first technique referred to as cross component linear model (CCLM), a second technique referred to as multi-model linear model (MMLM), a third technique referred to as convolutional cross-component model (CCCM), and a fourth technique referred to as gradient linear model (GLM).

For example, the first technique CCLM is used to reduce the cross-component redundancy. In the CCLM, the chroma samples are predicted based on the reconstructed luma samples of the same CU by using a linear model (also referred to as linear formular), such as using Eq. (1):

$$pred_C(i, j) = a \cdot rec'_L(i, j) + b \qquad \text{Eq. (1)}$$

where $pred_C(i,j)$ represents the predicted chroma samples in a CU and $rec_L'(i,j)$ represents the downsampled reconstructed luma samples of the same CU. The CCLM linear model includes parameters (a and b) that can be derived, in an example, with at most four neighbouring chroma samples and their corresponding down-sampled luma samples. In an example, the at most four neighbouring chroma samples and their corresponding down-sampled luma samples are referred to as templates of the CU.

In some examples, based on the location of the neighboring chroma samples, CCLM can include different modes that is referred to as LM_T (LM top mode or above mode LM_A), LM_L (LM left mode) and LM_LT (LM left top mode or left above mode LM_LA or just LM mode). For example, the dimensions of the current chroma block are W×H, then W' and H' can be set for various modes in CCLM. When LM mode (also referred to as LM_LT or LM_LA) is applied, W'=W, H'=H; when LM-A mode is applied, W'=W+H; when LM-L mode is applied, H'=H+W.

It is noted that MMLM, CCCM and GLM also use functions for prediction. Parameters of the functions can be derived based on templates.

It is noted that following description uses inter prediction to illustrate techniques for model based prediction methods, and the techniques can be suitably used for intra prediction.

According to some aspects of the disclosure, the model based prediction methods can construct a model, such as a linear model or a non-linear model, based on the already available data and then the model is applied to the subject data in order to improve its quality. The model based prediction methods work under the assumption that the data that was used to derive the model has high correlation with the subject data and therefore the model in many cases can be reliable. For example, an inter prediction refinement model is designed to minimize the distortion between the current block and its prediction block (generated based on a reference block in the corresponding reference picture based on the inter prediction refinement model). For example, an inter prediction refinement model (also referred to as method A, model based inter prediction technique, function based inter prediction technique) can apply a formular, such as a non-linear formular, a linear formular and the like, using an original reference block in the reference picture as input of the formular to generate the prediction block for the current block in a current picture. For example, an inter prediction refinement technique can generate a prediction of a sample in a current block based on a formular with one or more predicted samples in a reference picture as inputs. The formular can include linear terms or non-linear terms, and can include one or more parameters that can be derived. For example, the non-linear or linear terms can be defined by a formula with a set of parameters (e.g., denoted by $\alpha_i$ below without limitation of generality) that are derived based on the template of the current block and the template of the reference block of the current block (e.g., by using the least square method) by minimizing the difference between the template of the current block and the template of the reference block.

It is noted that LIC is one of such inter prediction refinement techniques.

In some examples, the formular is a linear formular, and can be represented by $$\sum_{i=0}^{n} (\alpha_i \times p(x_i, y_i)) + \beta,$$

where n is a non-negative integer number, and $p(x_i,y_i)$ is a predicted sample at a location $(x_i,y_i)$ in the reference picture, the predicted sample is pointed based on an MV associated with the current block. Further, a group of predicted samples that are represented by $p(x_i,y_i)$, where i=0, . . . , n, can be a group of predicted samples around a corresponding sample in the reference sample that are point by the MV based on a current sample to be predicted. In some examples, the parameter $\alpha_i$ and $\beta$ can be derived based on a template of the current block (also referred to as current block template) and a template of a prediction block (also referred to as prediction block template) for the current block (e.g., by using the least square method) by minimizing the difference between current block template and its prediction block template. The template of the current block is composed of the spatial neighboring reconstructed samples of the current block, the template of the prediction block is composed of the spatial neighboring reconstructed samples of the prediction block.

It is noted that while linear models are used to illustrate some embodiments in the present disclosure, non-linear models can be suitable used in the place of the linear models.

FIG. 8 shows diagrams of templates in some examples. For example, the template (810) is referred to as an L-shaped template $T_L$ and includes neighboring samples in an above row, a left column and at above-left corner of the current block (also referred to as current coded block); the template (820) is referred to as above and left template $T_{a+l}$ and includes neighboring samples in an above row and a left column of the current block; the template (830) is referred to as above template $T_a$ and includes neighboring samples in an above row of the current block; and the template (840) is referred to as left template Ti and includes neighboring samples in a left column of the current block. It is noted that a template can include neighboring samples of other suitable shape not shown in FIG. 8.

In some examples, multiple candidate template types can also be supported, and one candidate template type is selected to derive the parameters of the linear model or the non-linear model. A syntax can be signaled in the bitstream (e.g., at the block level) to indicate which candidate template type is selected.

In some examples, a control flag can be signaled in the bitstream (e.g., at the block level) in association with a model based inter prediction technique to indicate whether the model based inter prediction technique is applied on the current block or not. It is noted that in some examples, the value of the control flag can also be inherited from the other coded block. More specifically, a first control flag of the model based inter prediction technique associated with the current block is inherited from a second control flag of the model based inter prediction technique associated with another one or multiples coded blocks. Moreover, the control flag can be derived at the coding block level to adaptively determine whether the model based inter prediction technique is applied or not.

In some examples, a first control flag of a model based inter prediction technique associated with the current block is inherited from a second control flag of the model based inter prediction technique associated with another one or multiples coded blocks. In some examples, the coded information of the model based inter prediction technique can be derived from adjacent coded block, non-adjacent coded block, or the coded blocks which store the coded information within the buffer.

It is noted that, in the present disclosure, without limitation of the generality, in an example, the term parameter(s) refers to the parameters $\alpha_i$ and $\beta$ used to determine the linear or non-linear model for deriving the prediction block. The term template type refers to different template shapes, such as but no limited to one of the template types shown in FIG. 8 for the parameter derivation in the non-linear formular or linear formular.

According to some aspects of the disclosure, an additional clipping process can be applied with the parameters' derivations in the model based prediction methods. It is noted that any suitable clipping techniques can be applied in the additional clipping process. In some examples, the additional clipping process uses adaptive clipping techniques.

Generally, a clipping range determines the minimal and maximal values of the samples after the clipping process. For example, a clipping range (x,y) is inclusive of the upper and lower bounds, or the minimal and maximal values x and y of the clipping range. For example, when a bit depth is set to 8 bits, each sample of the subject signal can be clipped in a clipping range of (0, 255), the clipping process for an input z can be represented by Eq. (1):

$$\text{Clip}(0, 255, z) = \begin{cases} 0, & \text{for } z < 0 \\ 255, & \text{for } z > 0 \\ z, & \text{otherwise} \end{cases} \qquad \text{Eq. (1)}$$

In an example of adaptive clipping, two or more different clipping ranges can be used. A first clipping operation can be performed on a first portion of video data based on a first clipping range of the two or more different clipping ranges; performed on a first portion of video data based on a first clipping range of the two or more different clipping ranges;

and a second clipping operation can be performed on a second portion of the video data based on a second clipping range different from the first clipping range.

It is noted that, in some examples, mapping (also referred to as reshaping) techniques are used in video coding. The mapping techniques are used to achieve better exploiting the samples codewords values distribution of the pictures in a video. The mapping functions used in the mapping techniques can change value domains of samples.

The mapping and inverse mapping can be out of a decoding loop. For example, the mapping process can be applied to the input samples of the encoder, prior to the core encoding; and the inverse mapping process can be applied at decoder side to the output samples from the decoder.

The mapping and inverse mapping can also be in the decoding loop. In some examples, a technique that is referred to as luma mapping with chroma scaling (LMCS) is used for an in-loop reshaping. The mapping (a.k.a. reshaping) of the luma or chroma signal is achieved internally to the coding loop.

In some examples of LMCS, at the encoder, the residual signal before quantization is generated after applying the mapping function respectively to the original sample (to be coded) and the prediction sample. For example, the mapping function is applied to the original sample to generate a mapped original sample, the mapping function is also applied to the prediction sample to generate a mapped prediction sample, the residual signal is calculated as a difference of the mapped original sample and the mapped prediction sample. The residuals of a block can be transformed into transform coefficients, and the transform coefficients can be quantized. At the decoder, the residuals can be calculated by dequantization and inverse transform. Further, the mapping function is applied to the prediction sample to generate mapped prediction sample, then mapped prediction sample is combined with a residual signal to form mapped reconstruction sample. Further, the inverse mapping function is applied to the mapped reconstruction sample to generate the reconstruction sample.

According to some aspects of the disclosure, a clipping process (also referred to as additional clipping process) can be applied with the model based prediction technique, such as during model parameter derivation and/or reconstruction using the derived model. For example, encoder/decoder can perform at least a clipping operation on at least one of the current template and the reference template to obtain clipped template samples, and derive one or more parameter values of the one or more parameters of the model according to the clipped template samples.

In some aspects, the clipping process can be applied to none/one/or both templates before the model parameter derivation. In some aspects, the clipping process can be applied after applying the derived model.

In some examples, the additional clipping process is applied to one of the current template of the current block and the reference template of the reference block before the model parameter derivation, and the results of the clipping process can be the input of the model parameter derivation to derive the model for the model based prediction technique.

In some examples, the additional clipping process is applied to both of the current template of the current block and the reference template of the reference block before the model parameter derivation, and the result of the clipping process can be the input of the model parameter derivation to derive the model for the model based prediction technique.

In some examples, the additional clipping process is applied to none of the current template of the current block and the reference template of the reference block before the model parameter derivation, but is applied to the samples of the reference block. The result of the clipping process can be input to the model to calculate the prediction samples of the current block.

In some examples, the additional clipping process is applied to none of the current template of the current block and the reference template of the reference block before the model parameter derivation, but is applied to the prediction block of the current block, the prediction block is the result of applying the derived model on the reference block.

In some embodiments, the additional clipping process is applied to both the current template of the current block and the reference template of the reference block without of any additional conditions before the model parameter derivation. In some examples, regardless of whether both templates are in a same domain (value domain) or not, the additional clipping process is always applied to both the current template of the current block and the reference template of the reference block.

In some embodiments, the additional clipping process is applied to both the current template of the current block and reference template of the reference block before the model parameter derivation when and only when both current template of the current block and reference template of the reference block are in the original domain (e.g., no mapping function(s) that converts the domain has been applied to any of the templates). In an example, when some mapping methods, such as LMCS in VVC, is enabled in the decoder, the additional clipping process is applied to both current template of the current block and reference template of the reference block when and only when the current template and the reference template are collected from the picture(s) areas which were not affected by the LMCS. For example, the LMCS is not applied to the areas that include the current template and the reference template.

In some embodiments, which of the current template of the current block and/or reference template of the reference block has different domain than the original picture is determined. The additional clipping process is applied before the model parameter derivation for the template(s) that has different domain than the original picture. For example, a checking process of the current template and the reference template can be performed to determine whether the current template and/or the reference template are affected by mapping function. When the current template of the current block has different domain than the original picture (e.g., affected by a mapping function), the additional clipping process is applied before the model parameter derivation on the current template. When the reference template of the reference block has different domain than the original picture (e.g., affected by a mapping function), the additional clipping process is applied before the model parameter derivation on the reference template. When both of the current template and the reference template have different domain than the original picture (e.g., affected by a mapping function), the additional clipping process is applied before the model parameter derivation on both the current template and the reference template.

In some examples, one of the current template of the current block and the reference template of the reference block has different domain than the original picture and is referred to as different domain template. In an example, the additional clipping process is applied to the different domain template after the application of the inverse mapping function to the different domain template. In an example of LMCS, at the decoder, the residuals can be calculated by dequantization and inverse transform. Further, the mapping function is applied to the prediction samples to generate mapped prediction samples, then mapped prediction samples are combined with residuals to form mapped reconstruction samples. Further, the inverse mapping function is applied to the mapped reconstruction samples of the different domain template to generate the reconstruction samples of the different domain template, and the additional clipping process is applied to the reconstruction samples of the different domain template. The clipped reconstruction samples are then used as input to the model parameter derivation.

In another example, the additional clipping process is applied to the different domain template before the application of the inverse mapping function to the different domain template. In an example of LMCS, at the decoder, the residuals can be calculated by dequantization and inverse transform. Further, the mapping function is applied to the prediction samples to generate mapped prediction samples, then mapped prediction samples are combined with residuals to form mapped reconstruction samples. The additional clipping process is applied to the mapped reconstruction samples of the different domain template to generate clipped mapped reconstruction samples of the different domain template. Further, the inverse mapping function is applied to the clipped mapped reconstruction samples of the different domain template to generate the reconstruction samples of the different domain template. The reconstruction samples are then used as input to the model parameter derivation. In this example, an additional step of the inverse mapping of the clipping parameters occurs using the same mapping function as the template. In an example, the sample mapping function is applied to the upper value and lower value of a first clipping range of the reconstruction samples to obtain a second clipping range of mapped reconstruction samples. The second clipping range is used in the additional clipping process to be applied on the mapped reconstruction samples of the different domain template.

In another example, the additional clipping process is applied to the different domain template, instead of the application of the inverse mapping function to the template. For example, the inverse mapping function is not applied at all on the template. In an example of LMCS, at the decoder, the residuals can be calculated by dequantization and inverse transform. Further, the mapping function is applied to the prediction samples to generate mapped prediction samples, then mapped prediction samples are combined with residuals to form mapped reconstruction samples. The additional clipping process is applied to the mapped reconstruction samples of the different domain template to generate the reconstruction samples of the different domain template. The reconstruction samples are then used as input to the model parameter derivation.

In some embodiments, which of the current template of the current block and/or reference template of the reference block has the same domain with the original picture is determined, and then the additional clipping process is applied before the model parameter derivation for the template(s) that has the same domain with the original picture. For example, a checking process of the current template and the reference template can be performed to determine whether the current template and/or the reference template are affected by mapping function. When the current template of the current block has the same domain as the original picture (e.g., not affected by a mapping function), the additional clipping process is applied before the model parameter derivation on the current template. When the reference template of the reference block has the same domain as the original picture (e.g., not affected by a mapping function), the additional clipping process is applied before the model parameter derivation on the reference template. When both of the current template and the reference template have the same domain as the original picture (e.g., not affected by a mapping function), the additional clipping process is applied before the model parameter derivation on both the current template and the reference template.

In some examples, one of the two templates has the same domain as the original picture and is referred to as same domain template. In an example, the additional clipping process is applied to the same domain template prior to the model parameters generation. For example, the reconstruction samples of the same domain template are not affected by any mapping process, and the additional clipping process is applied to the reconstruction samples of the same domain template to generated clipped reconstruction samples, and the clipped reconstruction samples are used as input to the model parameter derivation.

In another example, an additional step of forward mapping is applied to the same domain template followed by the additional clipping process. This additional step of the forward mapping using the same mapping function as the template. The same mapping function is applied to the clipping range prior to the clipping process. For example, a mapping function is applied to the same domain template to generate mapped template samples, and then the additional clipping is applied on the mapped template samples to generate the clipped mapped samples. In an example, the clipped mapped samples are used as input to the model parameter derivation. In an example, a first clipping range is provided in the value domain of the original picture, and the mapping function is applied to the upper limit and the lower limit of the first clipping range to determine the upper limit and lower limit of a second clipping range, and the second clipping range is used in the additional clipping that is applied on the mapped template samples.

In some embodiments, the clipping range for the additional clipping is signaled at a suitable level, such as a picture parameter set (PPS) level, a picture header level, a subpicture level, a slice header level and/or a block level.

In some embodiments, the clipping range is derived at decoder side. The clipping range derivation can rely on input from samples of the current template or samples of the reference template. For example, the clipping range derivation is derived based on the average sample value of one of the current template and the reference template.

In some examples, the reference template is indicated by a motion vector between different frames (used in inter-frame prediction). In some examples, the reference template is indicated by a block vector within the same frames (used in intra-frame prediction).

FIG. 9 shows a flow chart outlining a process (900) according to an aspect of the disclosure. The process (900) can be used in a video decoder. In various aspects, the process (900) is executed by processing circuitry, such as the processing circuitry that performs functions of the video decoder (110), the processing circuitry that performs functions of the video decoder (210), and the like. In some aspects, the process (900) is implemented in software instructions, thus when the processing circuitry executes the software instructions, the processing circuitry performs the process (900). The process starts at (S901) and proceeds to (S910).

At (S910), a bitstream of coded information for a sequence of pictures is received. The coded information indicates a prediction of a current block in a current picture using a model based prediction technique. The model based prediction technique generates a prediction sample of the current block based on a model with one or more reconstructed samples of a reference block being input to the model, the model includes one or more parameters derived based on a current template of the current block and a reference template of the reference block.

At (S920), at least a clipping operation is performed on at least one of the current template and the reference template to obtain clipped template samples.

At (S930), one or more parameter values of the one or more parameters of the model are derived according to the clipped template samples.

At (S940), at least a prediction sample of the current block is generated by the model with the one or more parameters being set to the one or more parameter values.

In some examples, a clipping operation is performed on reference samples of the reference block to obtain clipped reference samples, and the model is applied on the clipped reference samples to generate prediction samples of the current block. In some examples, a clipping operation is performed on the prediction sample of the current block after the prediction sample being generated by the model.

According to an aspect of the disclosure, a first clipping operation is applied on the current template to obtain clipped current template samples, and a second clipping operation is applied on the reference template to obtain clipped reference template samples. In some examples, there is no checking whether the reference template and the current template are in the same value domain.

According to an aspect of the disclosure, whether the current template and the reference template are affected by a mapping function (e.g., that can change the value domain) are checked. When both of the current template and the reference template are not affected by the mapping function, a first clipping operation is performed on the current template to obtain clipped current template samples; and a second clipping operation is performed on the reference template to obtain clipped reference template samples. In some examples, whether the mapping function is enabled can be checked. When the mapping function is enabled, whether the current template and the reference template are affected by the mapping function is checked. When the current template and the reference template are not affected by the mapping function, the first clipping operation and the second clipping operation are performed.

According to another aspect of the disclosure, which of the current template and/or the reference template has a different value domain from an original picture of the current picture is checked (e.g., a mapping function is applied). When a template in the current template and the reference template has a different value domain from the original picture, a clipping operation is applied on the template to obtain clipped template samples of the template. In some examples, the clipping operation is applied on the template after an inverse mapping function being applied on the template. In some examples, the clipping operation is applied on the template before an inverse mapping function being applied on the template, and a clipping range for the clipping operation can be calculated according to a mapping function associated with the inverse mapping function. In some examples, the clipping operation is applied on the template without applying an inverse mapping function on the template before or after the clipping operation.

According to another aspect of the disclosure, which of the current template and/or the reference template has a same value domain as an original picture of the current picture is checked. When a template in the current template and the reference template has the same value domain as the original picture, a clipping operation is applied on the template to obtain clipped template samples of the template before the deriving the one or more parameter values. In some examples, the clipping operation is applied on the template after a mapping function being applied on the template. In an example, a clipping range for the clipping operation is calculated according to the mapping function.

According to another aspect of the disclosure, a signal indicative of a clipping range is decoded from the bitstream. The signal can be signaled at one of a picture level, a subpicture level, a slice level, a tile level and/or a block level.

According to another aspect of the disclosure, a clipping range of the clipping operation is derived based on sample values of the current template and/or the reference template, such as an average sample value of the current template and/or the reference template.

It is noted that the reference template can be located according to a motion vector for an inter frame prediction and/or a block vector for an intra-frame prediction.

Then, the process proceeds to (S999) and terminates.

The process (900) can be suitably adapted. Step(s) in the process (900) can be modified and/or omitted. Additional step(s) can be added. Any suitable order of implementation can be used.

Figure 10:
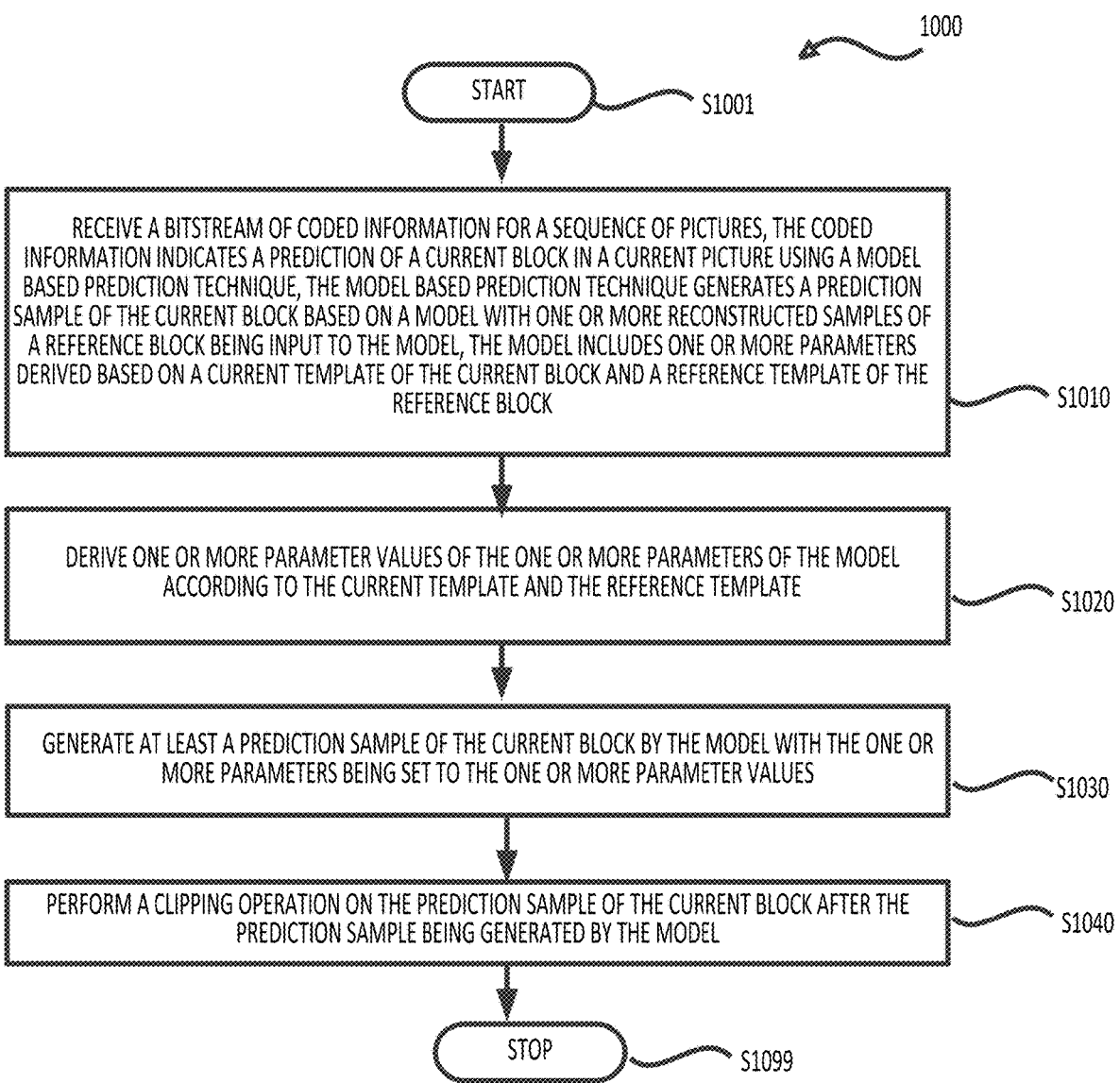
FIG. 10 shows a flow chart outlining a decoding process according to some aspects of the disclosure.

FIG. 10 shows a flow chart outlining a process (1000) according to an aspect of the disclosure. The process (1000) can be used in a video decoder. In various aspects, the process (1000) is executed by processing circuitry, such as the processing circuitry that performs functions of the video decoder (110), the processing circuitry that performs functions of the video decoder (210), and the like. In some aspects, the process (1000) is implemented in software instructions, thus when the processing circuitry executes the software instructions, the processing circuitry performs the process (1000). The process starts at (S1001) and proceeds to (S1010).

At (S1010), a bitstream of coded information for a sequence of pictures is received. The coded information indicates a prediction of a current block in a current picture using a model based prediction technique, the model based prediction technique generates a prediction sample of the current block based on a model with one or more reconstructed samples of a reference block being input to the model, the model includes one or more parameters derived based on a current template of the current block and a reference template of the reference block.

At (S1020), one or more parameter values of the one or more parameters of the model are derived according to the current template and the reference template.

At (S1030), at least a prediction sample of the current block is generated by the model with the one or more parameters being set to the one or more parameter values.

At (S1040), a clipping operation is applied on the prediction sample of the current block after the prediction sample being generated by the model.

Then, the process proceeds to (S1099) and terminates.

The process (1000) can be suitably adapted. Step(s) in the process (1000) can be modified and/or omitted. Additional step(s) can be added. Any suitable order of implementation can be used.

FIG. 11 shows a flow chart outlining a process (1100) according to an aspect of the disclosure. The process (1100) can be used in a video decoder. In various aspects, the process (1100) is executed by processing circuitry, such as the processing circuitry that performs functions of the video decoder (110), the processing circuitry that performs functions of the video decoder (210), and the like. In some aspects, the process (1100) is implemented in software instructions, thus when the processing circuitry executes the software instructions, the processing circuitry performs the process (1100). The process starts at (S1101) and proceeds to (S1110).

At (S1110), to code a current block in a current picture using a model based prediction technique is determined. The model based prediction technique generates a prediction sample of the current block based on a model with one or more reconstructed samples of a reference block being input to the model, the model includes one or more parameters derived based on a current template of the current block and a reference template of the reference block.

At (S1120), at least a clipping operation is performed on at least one of the current template and the reference template to obtain clipped template samples.

At (S1130), one or more parameter values of the one or more parameters of the model are derived according to the clipped template samples.

At (S1140), the current block is encoded based on the model with the one or more parameters being set to the one or more parameter values.

In some examples, a clipping operation is performed on reference samples of the reference block to obtain clipped reference samples, and the model is applied on the clipped reference samples to generate prediction samples of the current block. In some examples, a clipping operation is performed on the prediction sample of the current block after the prediction sample being generated by the model.

According to an aspect of the disclosure, a first clipping operation is applied on the current template to obtain clipped current template samples, and a second clipping operation is applied on the reference template to obtain clipped reference template samples. In some examples, there is no checking whether the reference template and the current template are in the same value domain.

According to an aspect of the disclosure, whether the current template and the reference template are affected by a mapping function (e.g., that can change the value domain) are checked. When both of the current template and the reference template are not affected by the mapping function, a first clipping operation is performed on the current template to obtain clipped current template samples; and a second clipping operation is performed on the reference template to obtain clipped reference template samples. In some examples, whether the mapping function is enabled can be checked. When the mapping function is enabled, whether the current template and the reference template are affected by the mapping function is checked. When the current template and the reference template are not affected by the mapping function, the first clipping operation and the second clipping operation are performed.

According to another aspect of the disclosure, which of the current template and/or the reference template has a different value domain from an original picture of the current picture is checked (e.g., a mapping function is applied).

When a template in the current template and the reference template has a different value domain from the original picture, a clipping operation is applied on the template to obtain clipped template samples of the template. In some examples, the clipping operation is applied on the template after an inverse mapping function being applied on the template. In some examples, the clipping operation is applied on the template before an inverse mapping function being applied on the template, and a clipping range for the clipping operation can be calculated according to a mapping function associated with the inverse mapping function. In some examples, the clipping operation is applied on the template without applying an inverse mapping function on the template before or after the clipping operation.

According to another aspect of the disclosure, which of the current template and/or the reference template has a same value domain as an original picture of the current picture is checked. When a template in the current template and the reference template has the same value domain as the original picture, a clipping operation is applied on the template to obtain clipped template samples of the template before the deriving the one or more parameter values. In some examples, the clipping operation is applied on the template after a mapping function being applied on the template. In an example, a clipping range for the clipping operation is calculated according to the mapping function.

According to another aspect of the disclosure, a signal indicative of a clipping range is encoded (signaled) into the bitstream. The signal can be signaled at one of a picture level, a subpicture level, a slice level, a tile level and/or a block level.

According to another aspect of the disclosure, a clipping range of the clipping operation is derived based on sample values of the current template and/or the reference template, such as an average sample value of the current template and/or the reference template.

It is noted that the reference template can be located according to a motion vector for an inter frame prediction and/or a block vector for an intra-frame prediction.

Then, the process proceeds to (S1199) and terminates.

The process (1100) can be suitably adapted. Step(s) in the process (1100) can be modified and/or omitted. Additional step(s) can be added. Any suitable order of implementation can be used.

Figure 12:
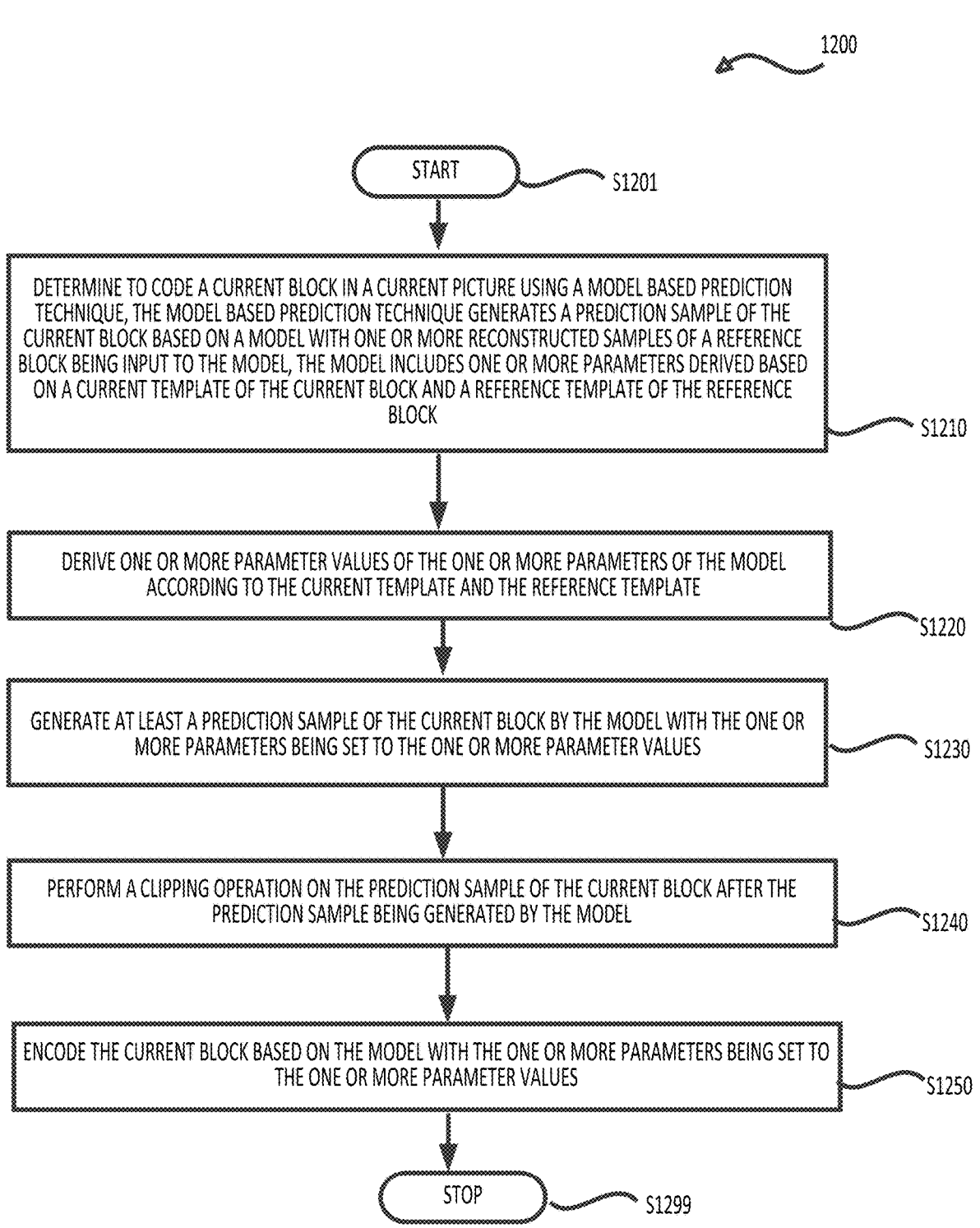
FIG. 12 shows a flow chart outlining an encoding process according to some aspects of the disclosure.

FIG. 12 shows a flow chart outlining a process (1200) according to an aspect of the disclosure. The process (1200) can be used in a video decoder. In various aspects, the process (1200) is executed by processing circuitry, such as the processing circuitry that performs functions of the video decoder (120), the processing circuitry that performs functions of the video decoder (210), and the like. In some aspects, the process (1200) is implemented in software instructions, thus when the processing circuitry executes the software instructions, the processing circuitry performs the process (1200). The process starts at (S1201) and proceeds to (S1210).

At (S1210), to code a current block in a current picture using a model based prediction technique is determined. The model based prediction technique generates a prediction sample of the current block based on a model with one or more reconstructed samples of a reference block being input to the model, the model includes one or more parameters derived based on a current template of the current block and a reference template of the reference block.

At (S1220), one or more parameter values of the one or more parameters of the model are derived according to the current template and the reference template.

At (S1230), at least a prediction sample of the current block is generated by the model with the one or more parameters being set to the one or more parameter values.

At (S1240), a clipping operation is performed on the prediction sample of the current block after the prediction sample being generated by the model.

At (S1250), the current block is encoded based on the model with the one or more parameters being set to the one or more parameter values.

Then, the process proceeds to (S1299) and terminates.

The process (1200) can be suitably adapted. Step(s) in the process (1200) can be modified and/or omitted. Additional step(s) can be added. Any suitable order of implementation can be used.

According to an aspect of the disclosure, a method of processing visual media data is provided. In the method, a bitstream of visual media data is processed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

For example, the bitstream includes coded information of one or more pictures, the coded information indicates a prediction of a current block in a current picture using a model based prediction technique, the model based prediction technique generates a prediction sample of the current block based on a model with one or more reconstructed samples of a reference block being input to the model, the model includes one or more parameters derived based on a current template of the current block and a reference template of the reference block. The format rule specifies that at least a clipping operation is performed on at least one of the current template and the reference template to obtain clipped template samples; one or more parameter values of the one or more parameters of the model are derived according to the clipped template samples; and at least a prediction sample of the current block is generated by the model with the one or more parameters being set to the one or more parameter values.

The techniques described above, can be implemented as computer software using computer-readable instructions and physically stored in one or more computer-readable media. For example, FIG. 13 shows a computer system (1300) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
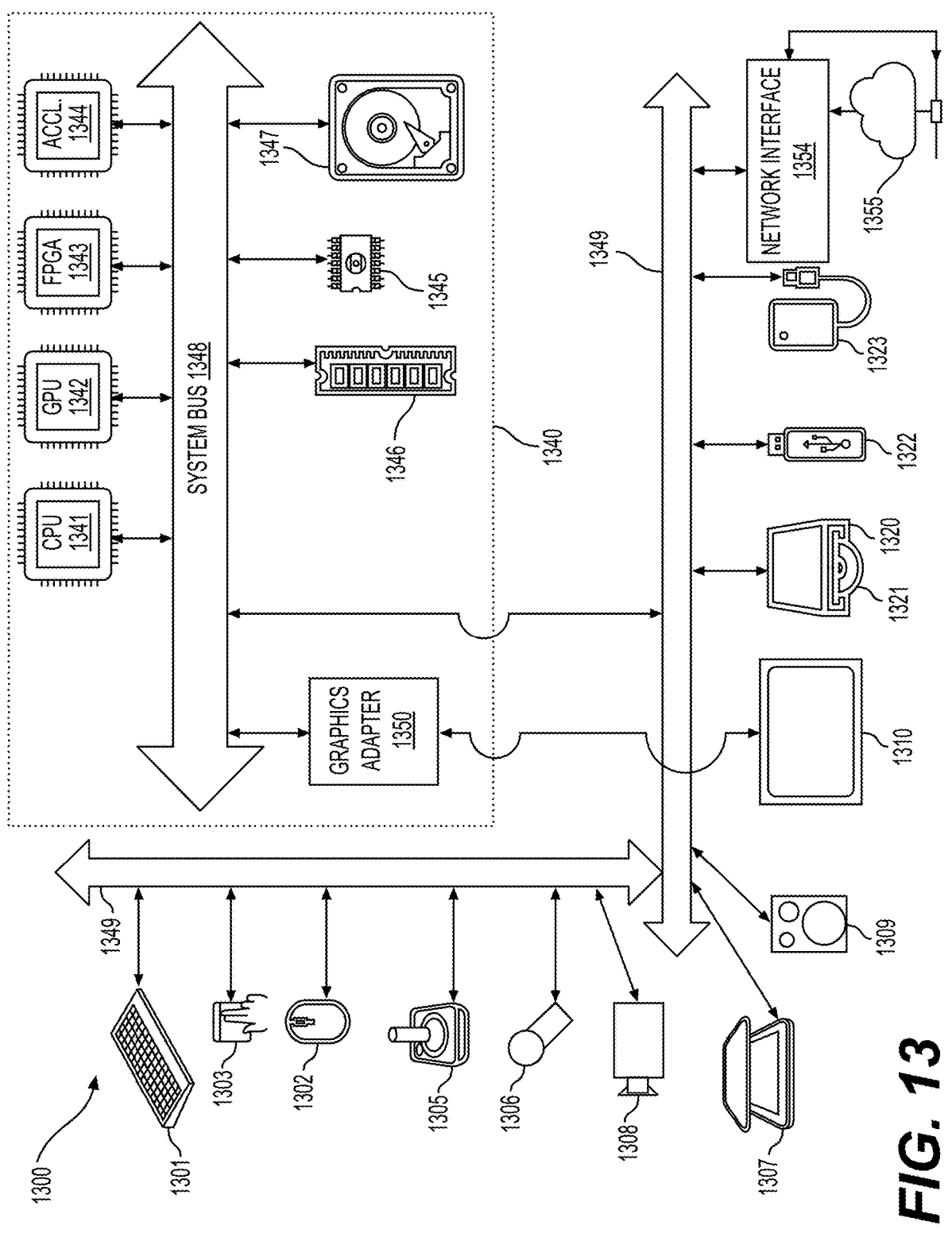
FIG. 13 is a schematic illustration of a computer system in accordance with an aspect.

The components shown in FIG. 13 for computer system (1300) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various aspects of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hard-wired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclo-sure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method of video decoding, the method including: receiving a bitstream of coded information for a sequence of pictures, the coded information indicating a prediction of a current block in a current picture using a model based prediction technique, the model based prediction technique generating a prediction sample of the current block based on a model with one or more reconstructed samples of a reference block being input to the model, the model includ-ing one or more parameters derived based on a current template of the current block and a reference template of the reference block; performing at least a clipping operation on at least one of the current template and the reference template to obtain clipped template samples; deriving one or more parameter values of the one or more parameters of the model according to the clipped template samples; and gen-erating at least a prediction sample of the current block by the model with the one or more parameters being set to the one or more parameter values.

(2) The method of feature (1), the method further includ-ing: performing a clipping operation on reference samples of the reference block to obtain clipped reference samples; and applying the model on the clipped reference samples to generate prediction samples of the current block.

(3) The method of any of features (1) to (2), the method further including: performing a clipping operation on the prediction sample of the current block after the prediction sample being generated by the model.

(4) The method of any of features (1) to (3), the method further including: performing a first clipping operation on the current template to obtain clipped current template samples; and performing a second clipping operation on the reference template to obtain clipped reference template samples.

(5) The method of any of features (1) to (4), the method further including: checking whether the current template and the reference template are affected by a mapping function; and when both of the current template and the reference template are not affected by the mapping function, perform-ing a first clipping operation on the current template to obtain clipped current template samples; and performing a second clipping operation on the reference template to obtain clipped reference template samples.

(6) The method of any of features (1) to (5), the method further including: checking whether the mapping function is enabled; when the mapping function is enabled, checking whether the current template and the reference template are affected by the mapping function; and when the current template and the reference template are not affected by the mapping function, performing the first clipping operation and the second clipping operation.

(7) The method of any of features (1) to (6), the method also including: checking which of the current template and/or the reference template has a different value domain from an original picture of the current picture; and when a template in the current template and the reference template has a different value domain from the original picture, performing a clipping operation on the template to obtain clipped template samples of the template.

(8) The method of any of features (1) to (7), the method also including: applying the clipping operation on the tem-plate after an inverse mapping function being applied on the template.

(9) The method of any of features (1) to (8), the method also including: applying the clipping operation on the tem-plate before an inverse mapping function being applied on the template.

(10) The method of any of features (1) to (9), the method also including: calculating a clipping range for the clipping operation according to a mapping function associated with the inverse mapping function.

(11) The method of any of features (1) to (10), the method also including applying the clipping operation on the tem-plate without applying an inverse mapping function on the template before or after the clipping operation.

(12) The method of any of features (1) to (11), the method also including checking which of the current template and/or the reference template has a same value domain as an original picture of the current picture; and when a template in the current template and the reference template has the same value domain as the original picture, performing a clipping operation on the template to obtain clipped template samples of the template before the deriving the one or more parameter values.

(13) The method of any of features (1) to (12), the method also including: applying the clipping operation on the tem-plate after a mapping function being applied on the template.

(14) The method of any of features (1) to (13), the method also including: calculating a clipping range for the clipping operation according to the mapping function.

(15) The method of any of features (1) to (14), the method including: decoding a signal indicative of a clipping range, the signal being one of a picture level, a subpicture level, a slice level, a tile level and/or a block level.

(16) The method of any of features (1) to (15), the method including: deriving a clipping range of the clipping opera-tion based on an average sample value of the current template and/or the reference template.

(17) The method of any of features (1) to (16), the method also including: locating the reference template according to a motion vector for an inter frame prediction and/or a block vector for an intra-frame prediction.

(18) A method of video encoding, the method including: determining to code a current block in a current picture using a model based prediction technique, the model based prediction technique generating a prediction sample of the current block based on a model with one or more reconstructed samples of a reference block being input to the model, the model including one or more parameters derived based on a current template of the current block and a reference template of the reference block; performing at least a clipping operation on at least one of the current template and the reference template to obtain clipped template samples; deriving one or more parameter values of the one or more parameters of the model according to the clipped template samples; and encoding the current block based on the model with the one or more parameters being set to the one or more parameter values.

(19) The method of feature (18), the method also including: performing a clipping operation on reference samples of the reference block to obtain clipped reference samples; and applying the model on the clipped reference samples to generate prediction samples of the current block.

(20) The method of any of features (18) to (19), the method also including: generating at least a prediction sample of the current block by the model with the one or more parameters being set to the one or more parameter values; and performing a clipping operation on the prediction sample of the current block after the prediction sample being generated by the model.

(21) The method of any of features (18) to (20), the method also including: performing a first clipping operation on the current template to obtain clipped current template samples; and performing a second clipping operation on the reference template to obtain clipped reference template samples.

(22) The method of any of features (18) to (21), the method also including: checking whether the current template and the reference template are affected by a mapping function; and when both of the current template and the reference template are not affected by the mapping function, performing a first clipping operation on the current template to obtain clipped current template samples; and performing a second clipping operation on the reference template to obtain clipped reference template samples.

(23) The method of any of features (18) to (22), the method also including: checking whether the mapping function is enabled; when the mapping function is enabled, checking whether the current template and the reference template are affected by the mapping function; and when the current template and the reference template are not affected by the mapping function, performing the first clipping operation and the second clipping operation.

(24) The method of any of features (18) to (23), the method also including: checking which of the current template and/or the reference template has a different value domain from an original picture of the current picture; and when a template in the current template and the reference template has a different value domain from the original picture, performing a clipping operation on the template to obtain clipped template samples of the template.

(25) The method of any of features (18) to (24), the method also including: applying the clipping operation on the template after an inverse mapping function being applied on the template.

(26) The method of any of features (18) to (25), the method further including: applying the clipping operation on the template before an inverse mapping function being applied on the template.

(27) The method of any of features (18) to (26), the method including: calculating a clipping range for the clipping operation according to a mapping function associated with the inverse mapping function.

(28) The method of any of features (18) to (27), the method including: applying the clipping operation on the template without an inverse mapping function being applied on the template before or after the clipping operation.

(29) The method of any of features (18) to (28), the method also including: checking which of the current template and/or the reference template has a same value domain as an original picture of the current picture; and when a template in the current template and the reference template has the same value domain as the original picture, performing a clipping operation on the template to obtain clipped template samples of the template before the deriving the one or more parameter values.

(30) The method of any of features (18) to (29), the method also including: applying the clipping operation on the template after a mapping function being applied on the template.

(31) The method of any of features (18) to (30), the method also including: calculating a clipping range for the clipping operation according to the mapping function

(32) The method of any of features (18) to (31), the method also including: encoding a signal indicative of a clipping range, the signal being signaled at one of a picture level, a subpicture level, a slice level, a tile level and/or a block level.

(33) The method of any of features (18) to (32), the method further including: deriving a clipping range of the clipping operation based on an average sample value of the current template and/or the reference template.

(34) The method of any of features (18) to (33), the method further including: locating the reference template according to a motion vector for an inter frame prediction and/or a block vector for an intra-frame prediction.

(35) A method of processing visual media data, the method including processing a bitstream of visual media data according to a format rule. The bitstream includes coded information of a current block in a current picture, the coded information indicating a prediction of a current block in a current picture using a model based prediction technique, the model based prediction technique generating a prediction sample of the current block based on a model with one or more reconstructed samples of a reference block being input to the model, the model including one or more parameters derived based on a current template of the current block and a reference template of the reference block; and the format rule specifies that: at least a clipping operation is performed on at least one of the current template and the reference template to obtain clipped template samples; one or more parameter values of the one or more parameters of the model are derived according to the clipped template samples; and at least a prediction sample of the current block is generated by the model with the one or more parameters being set to the one or more parameter values.

(36) A method of video decoding, the method including: receiving a bitstream of coded information for a sequence of pictures, the coded information indicating a prediction of a current block in a current picture using a model based prediction technique, the model based prediction technique generating a prediction sample of the current block based on a model with one or more reconstructed samples of a reference block being input to the model, the model including one or more parameters derived based on a current template of the current block and a reference template of the reference block; deriving one or more parameter values of the one or more parameters of the model according to the current template and the reference template; generating at least a prediction sample of the current block by the model with the one or more parameters being set to the one or more parameter values; and performing a clipping operation on the prediction sample of the current block after the prediction sample being generated by the model.

(37) A method of video encoding, the method including: determining to code a current block in a current picture using a model based prediction technique, the model based prediction technique generating a prediction sample of the current block based on a model with one or more reconstructed samples of a reference block being input to the model, the model including one or more parameters derived based on a current template of the current block and a reference template of the reference block; deriving one or more parameter values of the one or more parameters of the model according to the current template and the reference template; generating at least a prediction sample of the current block by the model with the one or more parameters being set to the one or more parameter values; performing a clipping operation on the prediction sample of the current block after the prediction sample being generated by the model; and encoding the current block based on the model with the one or more parameters being set to the one or more parameter values.

(38) An apparatus for video decoding, including processing circuitry that is configured to perform the method of any of features (1) to (17) and feature (36).

(29) An apparatus for video encoding, including processing circuitry that is configured to perform the method of any of features (18) to (34) and feature (37).

(30) A non-transitory computer-readable storage medium storing instructions which when executed by at least one processor cause the at least one processor to perform the method of any of features (1) to (37).

What is claimed is:

1. A method of video decoding, comprising:

receiving a bitstream of coded information for a sequence of pictures, the coded information indicating a prediction of a current block in a current picture using a model based prediction technique, the model based prediction technique generating a prediction sample of the current block based on a model with one or more reconstructed samples of a reference block being input to the model, the model including one or more parameters derived based on a current template of the current block and a reference template of the reference block;

performing at least a clipping operation on at least one of the current template and the reference template to obtain clipped template samples;

deriving one or more parameter values of the one or more parameters of the model according to the clipped template samples; and generating at least a prediction sample of the current block by the model with the one or more parameters being set to the one or more parameter values.

2. The method of claim 1, further comprising:

performing a clipping operation on reference samples of the reference block to obtain clipped reference samples; and applying the model on the clipped reference samples to generate prediction samples of the current block.

3. The method of claim 1, further comprising:

performing a clipping operation on the prediction sample of the current block after the prediction sample being generated by the model.

4. The method of claim 1, wherein the performing at least the clipping operation further comprises:

performing a first clipping operation on the current template to obtain clipped current template samples; and performing a second clipping operation on the reference template to obtain clipped reference template samples.

5. The method of claim 1, further comprising:

checking whether the current template and the reference template are affected by a mapping function; and when both of the current template and the reference template are not affected by the mapping function, performing a first clipping operation on the current template to obtain clipped current template samples, and performing a second clipping operation on the reference template to obtain clipped reference template samples.

6. The method of claim 5, further comprising:

checking whether the mapping function is enabled;

when the mapping function is enabled, checking whether the current template and the reference template are affected by the mapping function; and when the current template and the reference template are not affected by the mapping function, performing the first clipping operation and the second clipping operation.

7. The method of claim 1, further comprising:

checking which of the current template and/or the reference template has a different value domain from an original picture of the current picture; and when a template in the current template and the reference template has a different value domain from the original picture, performing a clipping operation on the template to obtain clipped template samples of the template.

8. The method of claim 7, wherein the performing the clipping operation on the template further comprises:

applying the clipping operation on the template after an inverse mapping function being applied on the template.

9. The method of claim 7, wherein the performing the clipping operation on the template further comprises:

applying the clipping operation on the template before an inverse mapping function being applied on the template.

10. The method of claim 9, further comprising:

calculating a clipping range for the clipping operation according to a mapping function associated with the inverse mapping function.

11. The method of claim 7, wherein the performing the clipping operation on the template further comprises:

applying the clipping operation on the template without applying an inverse mapping function on the template before or after the clipping operation.

12. The method of claim 1, further comprising:

checking which of the current template and/or the reference template has a same value domain as an original picture of the current picture; and when a template in the current template and the reference template has the same value domain as the original picture, performing a clipping operation on the template to obtain clipped template samples of the template before the deriving the one or more parameter values.

13. The method of claim 12, further comprising:

applying the clipping operation on the template after a mapping function being applied on the template.

14. The method of claim 13, further comprising:

calculating a clipping range for the clipping operation according to the mapping function.

15. The method of claim 1, further comprising:

decoding a signal indicative of a clipping range, the signal being one of a picture level, a subpicture level, a slice level, a tile level and/or a block level.

16. The method of claim 1, further comprising:

deriving a clipping range of the clipping operation based on an average sample value of the current template and/or the reference template.

17. The method of claim 16, further comprising:

locating the reference template according to a motion vector for an inter frame prediction and/or a block vector for an intra-frame prediction.

18. A method of video encoding, comprising:

determining to code a current block in a current picture using a model based prediction technique, the model based prediction technique generating a prediction sample of the current block based on a model with one or more reconstructed samples of a reference block being input to the model, the model including one or more parameters derived based on a current template of the current block and a reference template of the reference block;

performing at least a clipping operation on at least one of the current template and the reference template to obtain clipped template samples;

deriving one or more parameter values of the one or more parameters of the model according to the clipped template samples; and encoding the current block based on the model with the one or more parameters being set to the one or more parameter values.

19. The method of claim 18, further comprising at least one of:

performing a clipping operation on reference samples of the reference block to obtain clipped reference samples; and/or performing a clipping operation on a prediction sample of the current block after the prediction sample being generated by the model.

20. A method of processing visual media data, the method comprising:

processing a bitstream of visual media data according to a format rule:

the bitstream includes coded information of a current block in a current picture, the coded information indicating a prediction of a current block in a current picture using a model based prediction technique, the model based prediction technique generating a prediction sample of the current block based on a model with one or more reconstructed samples of a reference block being input to the model, the model including one or more parameters derived based on a current template of the current block and a reference template of the reference block; and the format rule specifies that:

at least a clipping operation is performed on at least one of the current template and the reference template to obtain clipped template samples;

one or more parameter values of the one or more parameters of the model are derived according to the clipped template samples; and at least a prediction sample of the current block is generated by the model with the one or more parameters being set to the one or more parameter values.

* * * * *